United States Patent [19]
Sugioka

[11] 3,836,721
[45] Sept. 17, 1974

[54] TIME MULTIPLEX COMMUNICATION SYSTEM FOR USE WITH A SPACE SATELLITE

[75] Inventor: Ryoichi Sugioka, Kawasaki, Japan

[73] Assignee: Fujitsu Limited, Kawasaki, Japan

[22] Filed: Dec. 23, 1971

[21] Appl. No.: 211,766

Related U.S. Application Data

[63] Continuation of Ser. No. 850,205, Aug. 14, 1969, abandoned.

[30] Foreign Application Priority Data

Aug. 15, 1968 Japan .............................. 43-58321
Aug. 15, 1968 Japan .............................. 43-58322

[52] U.S. Cl. ............ 179/15 BS, 178/69.5 R, 325/4
[51] Int. Cl. ............................................ H04j 3/06
[58] Field of Search .................... 179/15 BS; 325/4; 178/69.5 R

[56] References Cited

UNITED STATES PATENTS 3,566,267 2/1971 Golding ................................ 325/4

*Primary Examiner*—Ralph D. Blakeslee
*Attorney, Agent, or Firm*—Herbert L. Lerner

[57] ABSTRACT

The time of radiating information signals from a plurality of ground stations to a common satellite is regulated, as is the amount of radiated information, in order to prevent confusion of the signals at the satellite. The instant of receipt, at each ground station, of each time-regulated series or burst of signals is forecast and the forecast controls the operation of the transmitting synchronizing device and the receiving synchronizing device at each ground station.

3 Claims, 10 Drawing Figures

TIME MULTIPLEX COMMUNICATION SYSTEM FOR USE WITH A SPACE SATELLITE

This is a continuation of application, Ser. No. 850,205, filed Aug. 14, 1969, now abandoned.

DESCRIPTION OF THE INVENTION

The present invention relates to a time multiplex communication system. More particularly, the invention relates to a synchronizing system in a time multiplex communication system and especially to a time multiplex communication system wherein a plurality of ground stations mutually communicate simultaneously through a communication satellite located in space.

A communication system utilizing a communication satellite may be divided into a frequency division system and a time division system. A time division system is more effective in utilizing the satellite effectively, that is, in relaying as much information as possible. In order to provide communication between a number of ground stations without confusion by utilizing a time division system, it is necessary to regulate the time of radiating or transmitting information signals from each ground station to the satellite, so that information signals from a number of ground stations are prevented from being mutually over-lapped on the satellite. If the satellite is in an ideal condition, that is, completely at a standstill at a determined position, and the relative positions of the ground stations and the satellite are never varied, it is possible to maintain the entire communication system in synchronism by fixedly regulating the time of radiating information signals from each ground station, considering the distance between the satellite and the ground station. Actually, however, the relative position of the satellite is varied considerably due to the motion of celestial bodies, including the earth, and the ebb and flow of the tide on the earth. Therefore, if the time of radiating information signals from each station is fixedly regulated, the synchronous condition of the communication system will be lost and will create confusion.

The principal object of the present invention is to provide a new and improved time multiplex communication system.

An object of the present invention is to provide a new and improved time multiplex communication system for use with a space satellite.

An object of the present invention is to provide a new and improved ground station system for a time multiplex communication system for use with a space satellite.

An object of the present invention is to provide a ground station system for a time multiplex communication system for use with a space satellite which compensates for loss of synchronism due to variation of the relative positions of the satellite and the ground station.

An object of the present invention is to provide a ground station system for a time multiplex communication system for use with a space satellite, which ground station system is of simple structure and is efficient, effective and reliable in operation and which communication system is efficient, effective and reliable in operation.

In the communication system of the present invention, as hereinbefore described, the time of radiating information signals from each ground station to the satellite is regulated and, as hereinafter described, the amount of information radiated is also regulated in time, that is, the duration of the information signal is regulated. An information signal regulated in time at the ground station is hereinafter referred to as the burst.

The communication system of the present invention attains the foregoing objects by forecasting the instant of receiving the head of each burst at a specific ground station and providing for normal operation of the transmitting synchronizing device and the receiving synchronizing device of said station on the basis of forecast instant. The instant that the head of each burst is received in a specific frame may be forecast from the instant that the bursts from the specific ground station and other stations are suitably received in the specific frames via a communication satellite. The forecast value may be corrected by judging from the instant of suitable or correct receipt of the station discriminating signal provided in the burst.

Therefore, in each ground station of the communication system of the present invention, the receiving part is provided with a receiving synchronizing device including a station discriminating signal detector, a counter and a counter controlling circuit. The detector, counter and counter controlling circuit are common to a plurality of bursts. A memory device controls the station discriminating signal detector, the counter and the counter controlling circuit and utilizes them corresponding to the bursts in accordance with the principle of time division. The memory device memorizes the order and time relation of utilization of a communication satellite by a plurality of stations and the address controlling circuit. The transmitter or transmitting part is provided with a transmitting synchronizing device including a register for memorizing the difference between the forecast time of receiving each station's burst and the time of sending out or transmitting each station's burst. Each station's clock pulse counter is started or initiated in operation by the burst start time signal of each station's burst. A coincidence detecting circuit detects the coincidence of the content of the counter with the content of the register and generates each station's burst transmission start signal. The content of the register corresponding to the differences between the forecast time of receiving each station's burst and the time of receiving an arbitrary other station's burst is corrected.

In accordance with the present invention, in a time division communication system in which a single transmission medium is utilized by a plurality of stations in a time division relationship, each of the plurality of stations transmits a signal burst including starting, synchronziing, station identifying and information signals. Each of the plurality of stations comprises a receiving synchronizing device having a station discriminating signal detector for determining the station of origin of received signals. A counter forecasts the starting signal of a burst. A counter control circuit coupled to the counter controls the counter. A memory device coupled to each of the signal detector, the counter and the counter control circuit controls the signal detector, the counter and the counter control circuit in correspondence with the bursts transmitted by the stations and in accordance with the time division relationship. The memory device includes an address control circuit and records the order of control of the signal detector, the counter and the counter control circuit and the time relation of the plurality of stations in the single transmission medium and the address control circuit.

The single transmission medium comprises a communication satellite, which is in orbit in outer space.

The signal detector, the counter and the counter control circuit are common to a plurality of bursts. The memory device records the conditions of the bursts transmitted by the stations, the station identifying signals and the order of receipt of the bursts. The memory device has addresses corresponding to the bursts and records the count of the intervals between the bursts. Each of the stations comprises clock means for producing clock pulses and the clock pulses are utilized in the memory devices. Each of the stations further comprises time correcting means for correcting the time relations recorded in the memory device in accordance with the order of receipt of the bursts.

Each of the plurality of stations further comprises clock means for producing clock pulses and a transmitting synchronizing device having a register for recording the difference between the forecast of the counter of the receiving synchronizing device of the station and the time of transmission of the burst of the station. A clock pulse counter counts clock pulses. The clock pulse counter is started by the starting signal of the burst of the station. A coincidence detecting circuit determines the coincidence of the contents of the clock pulse counter with the contents of the register and produces a burst transmission starting signal for the station. Correcting means corrects the contents of the register corresponding to the recorded difference in the register.

In order that the present invention may be readily carried into effect, it will now be described with reference to the accompanying drawings, wherein.

Figure 1:
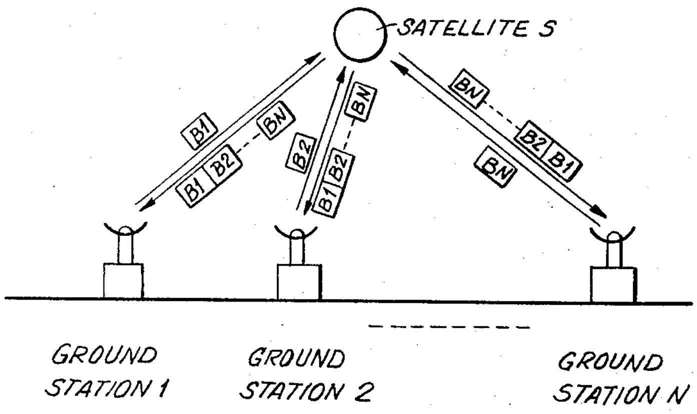
FIG. 1 is a schematic diagram of a satellite communication system.

The satellite communication system of FIG. 1, utilizes the PCM multiple assignment system and is an example of a system to which the present invention may be applied. A satellite communication system of the type of FIG. 1 is disclosed in an article by J. G. Puente et al in "I.E.E.E. Internation Conference on Communication Digest," 1967, Session 33, Paper 33–1, page 147, entitled "A Satellite TOM Multiple Access Experiment." Only the principal part of the communication system, related to the invention, will be thus described herein.

The satellite communication system of FIG. 1 comprises a single communication satellite S and N ground stations 1, 2, . . . . . N. The bursts B1, B2, . . . . . BN are radiated from the ground stations 1, 2, . . . . . N at time assigned to the various stations, relayed by the communication satellite S and are received by said stations 1, 2,. . . . . N.

Figure 2:
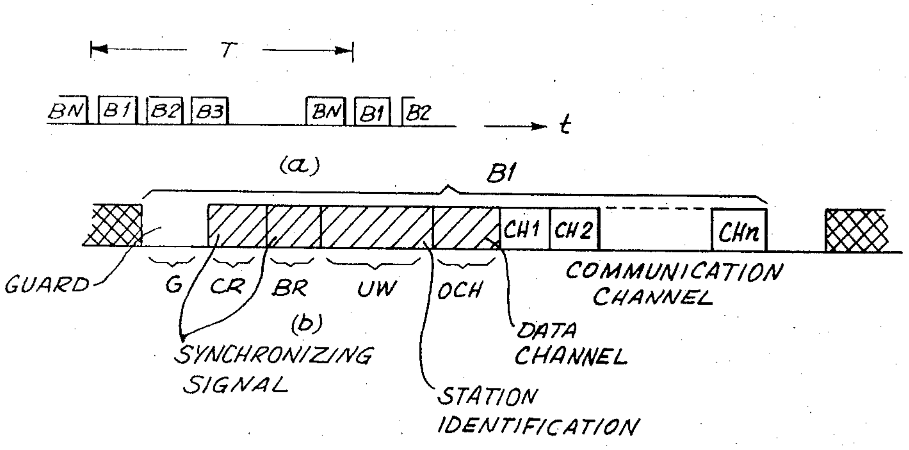
FIG. 2 is a pair of graphical presentations for assisting in explaining the operation of the time multiplex communication system of the present invention.

FIG. 2 shows a burst train on a satellite. The bursts are radiated from ground station 1 at time B1 and from ground station N at time BN, so that said bursts are prevented from mutual overlapping on the satellite. Furthermore, the bursts 1, 2, . . . . . N are radiated within one sampling period T of a time division system, and this is repeated. Illustration *b* of FIG. 2 is an example of the content of the information of a PCM signal pulse train included in a burst B1.

In guard time G, which is first, as shown in curve *b* of FIG. 2, no electric wave is radiated from any ground station. This avoids overlap with the immediately preceding burst. Guard time G is followed by synchronizing signals CR and BR for causing the burst B1 to be correctly received by the ground stations. The synchronizing signals CR and BR are followed by a signal UW, which indicated the name of the ground station radiating the burst B1. The signal UW is followed by a data channel OCH used for the channel control or other various control purposes. The data channel OCH is followed by a PCM pulse train of the communication channel CH1, CH2, . . . . . CH*n*.

Communication between two ground stations can be accomplished, for example, by radiating the signals from ground station 1 in channel CH1 of burst B1 and receiving and demodulating said signals at ground station 2 and, on the other hand, radiating the signals from ground station 2 in channel CH2 of burst B2 and receiving and demodulating said signals at ground station 1.

Various systems for effectively utilizing satellite channels with a number of ground stations have been invented. Two such systems related to the present invention are briefly explained herein. In the first system, known as the pre-assigned multiple access system, hereinafter called a PAMA system, the burst length of each ground station is fixed, that is, the number of transmitting talking channels of each station is fixed. Furthermore, the talking destinations of the channels in each burst are fixed.

In the second system, known as the variable destination multiple access system, hereinafter called a VDMA system, the burst length of each ground station is fixed, but the talking channels are freely usable corresponding to the destination required by the call. Besides the foregoing two systems, there are other systems in which the burst length is variable as a constant time has passed, in which the burst length is variable by each call, and so on. Depending on the traffic distribution of the call, the VDMA system is more effective than the PAMA system, since the satellite channels may be economized. This is evident from the fact that the satellite channels may be used at a high efficiency by the application of telephone traffic theory.

Figure 3:
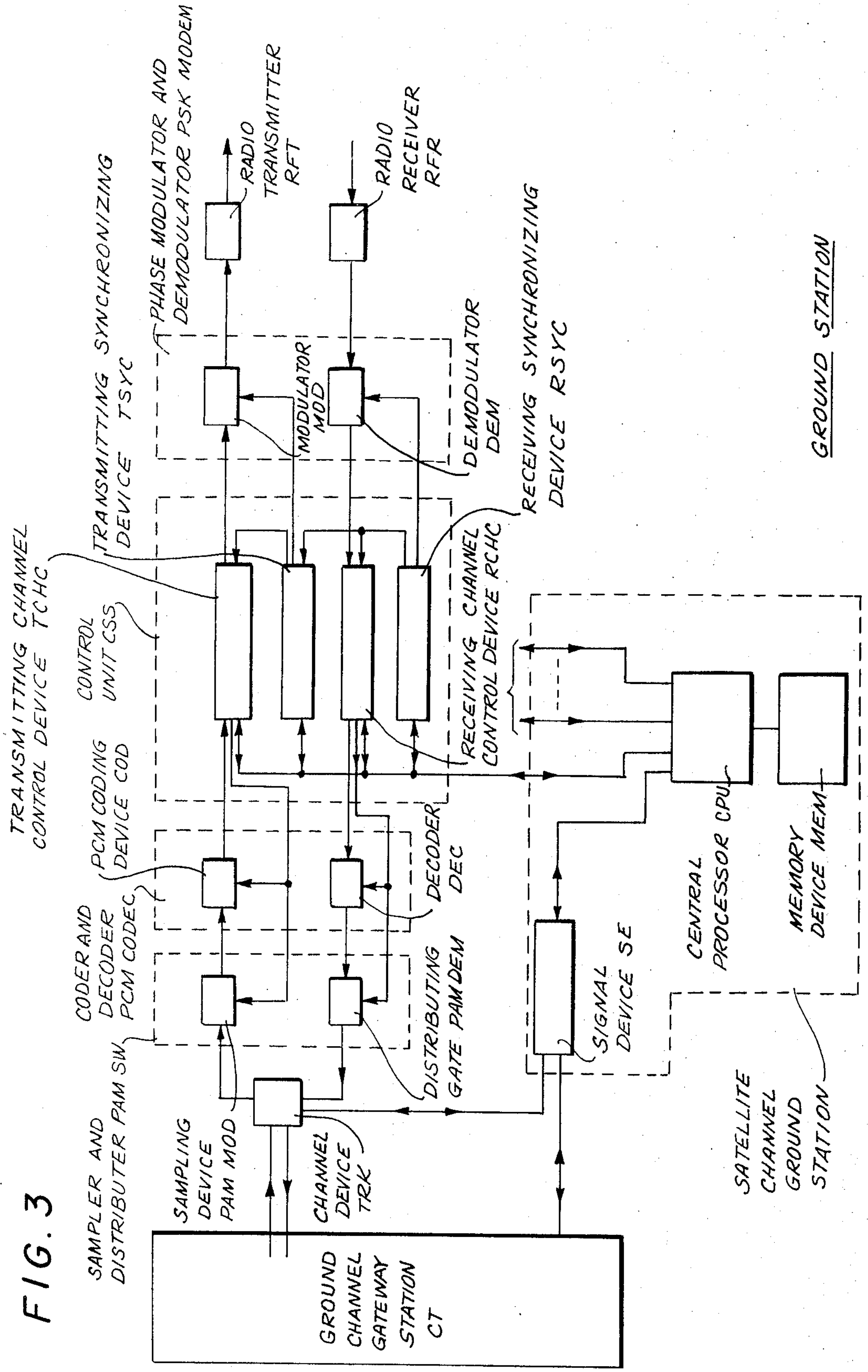
FIG. 3 is a block diagram of an embodiment of a ground station of the time multiplex communication system of the present invention.

FIG. 3 is a block diagram of the ground station of the present invention, in a PCM multiple assignment system. In FIG. 3, aural signals from a ground channel gateway station CT are sampled by a sampling device PAM MOD at designated times and at a constant period and are converted into a PCM signal pulse train by a PCM coding device COD of a coder and decoder PCM.CODEC. The PCM signal pulse train is passed through a modulator MOD of a phase modulator and demodulator PSK MODEM, which is controlled in time by a control unit CSS and is radiated toward the communication satellite from a radio transmitter RFT.

The signals from the communication satellite are first received by a radio receiver RFR and are converted into a PCM signal pulse train by a demodulator DEM of the phase modulator and demodulator PSK MODEM. The PCM signal pulse train are involved in synchronizing operations in the control unit CSS. The PCM signals are then demodulated by a decoder DEC into PAM signals. The PAM signals are distributed to the designated aural channels through a distributing gate PAM DEM of a sampler and distributor PAM SW and are converted into aural signals.

The aural signals are supplied to the ground channel gateway station CT via the ground channel. A complete bidirectional communication channel may thus be formed. Needless to say, as in general time division systems, the sampling device PAM MOD to the distributing gate PAM DEM in the aforedescribed system may commonly occupy a single transmission line, according to the principle of time division, and form multiplex communication channels simultaneously. In the aforedescribed signal route, the communication satellite receives and amplifies electric waves or bursts from the ground stations and, where necessary, converts the frequency of the bursts and radiates said bursts back to the ground.

In order to realize communication between a number of ground stations through the aforedescribed route, without confusion, and with the use of a single satellite, it is necessary to regulate the time of radiating the burst from each station to the satellite so that the bursts from the number of stations may not be mutually overlapped on the satellite. Here, such functions as designation of the times of radiating signals from the ground stations, synchronization of the received PCM pulse train, extraction of control informations out of said pulse train, and distribution of various kinds of clock pulses to the sampling device PAM MOD, the distributing gate PAM DEM, the PCM coding device COD and the PCM decoding device DEC are all performed by the control unit CSS, which will now be described in detail, since it is the principal part of the present invention.

On the other hand, channel control signals must be transferred between the ground channel gateway station CT and the satellite channel ground station. Such channel control signals are extracted corresponding to the channels from the channel device TRK, transmitted through said channel device TRK, or transferred via the separate common line signal channel between the ground channel gateway station CT and the satellite channel ground station.

As shown in FIG. 3, a signal device SE, a central processor CPU and a memory device MEM are provided at the satellite channel ground station for the purpose of transferring the signals between the satellite channel ground station and other stations. Channel control signals from the ground channel gateway station CT are read into the central processor CPU trhough the signal device SE, where the required processing and code conversion are effected on said signals. These signals are then inserted in the data channel OCH of the burst of the ground station of the ground channel gateway station CT and are transmitted to the other ground stations.

Conversely, signals from the other ground stations are extracted by the control unit CSS from the data channel OCH of the corresponding burst, read into the central process CPU to effect the required processing, and are then, if necessary transmitted to ground channel gateway station CT via the signal device SE. Besides the processing of channel signals as hereinbefore described, the central processor CPU also controls the processing of calls as a whole and controls devices in various parts of the control unit CSS. The central processor CPU also controls the operation of the system as a whole, in a known manner. Needless to say, the embodiment of FIG. 3 is simply a practical embodiment of the system of the present invention, and various other modifications are possible.

The present invention relates to a controlling system or control unit, and, more particularly, to a synchronizing system of a time multiplex communication system, as hereinbefore described, wherein a single transmission medium is utilized by a plurality of stations, in accordance with the principle of time division. An object of the synchronism is to determine the time of transmission of signals from each station, so that bursts from a plurality of stations are not mutually overlapped on the communication satellite. Another object of the synchronism is to receive the bursts from N stations at the proper times, that is, at the proper times for framing the burst signals.

These objects are achieved by the multiplex communication system of the present invention by forecasting the instant that the head of each burst will be received and providing for the normal operation of the transmitting synchronizing device and the receiving synchronizing device on the basis of the forecast instant. The forecast instant is referred to as the burst start time signal, hereafter called the SB signal, and said SB signal in a certain frame is forecast from the instant of proper receipt of bursts in the foregoing frames. The forecast value or magnitude may be corrected by judging from the instant of proper receipt, hereinafter called the UWP signal, of the station discriminating signal, hereinafter called the UW signal, in the burst.

Therefore, in each ground station of the system of the present invention, as hereinbefore described, the receiving part is provided with a receiving synchronizing device including a UW signal detector, a counter for the forecast of the SB signal and a counter control circuit. The detector, counter and counter control circuit are in common for a plurality of bursts. A memory device controls the UW signal detector, said counter and said counter control circuit in accordance with the bursts, in accordance with the principle of time division. The memory device memorizes the order and time relation of utilization of a communication satellite by a pluraliry of stations, and the address controlling circuit. The transmitting part is provided with a transmitting synchronizing device including a register for recording the difference between the forecast time of receipt of each station's burst and the time of transmission of each station's burst. Each station's clock pulse counter is started by the SB signal of said each station's burst. A coincidence detecting circuit detects the coincidence of the content of the counter with the content of the register and generates each station's burst transmission start signal. The content of the register is corrected in accordance with the difference between the forecast time of receipt of each station's burst and the time of receipt of an arbitrary other station's burst.

It is also possible to provide a UW signal detector, a counter for the forecast of the SB signal and a counter control circuit for each burst in the receiving part of a ground station. In the aforedescribed time multiplex communication system, the relative times of the received bursts are changed every instant due to the difference between the oscillation frequencies of the ground stations and the change of position of the satellite. It is thus necessary to change the forecast of the SB signal corresponding to the condition of operation of the system. If this change is accomplished by the counter and the counter control circuit provided for each burst, the control will become extremely complicated.

The system of the invention permits the following of the perpetual change of the relative times of the received bursts with considerable facility. To achieve this, in accordance with the present invention, only a single UW signal detector, counter and counter control circuit are provided and are utilized in accordance with the principle of time division by a memory device for memorizing the burst discriminating signal, the condition of operation of the burst and the relative time of the burst and the address control circuit. In the system of the present invention, informations concerning bursts are memorized in a memory device, so that even if the relative time of the received bursts are changed every instant, the burst forecast signal time may be corrected by always rewriting the contents of the memory device corresponding to the change. In the system of the invention, wherein informations concerning the relative times of all the bursts are memorized and are corrected by a control device in accordance with the received bursts, the aforedescribed operation may be realized with considerable facility.

Figure 4:
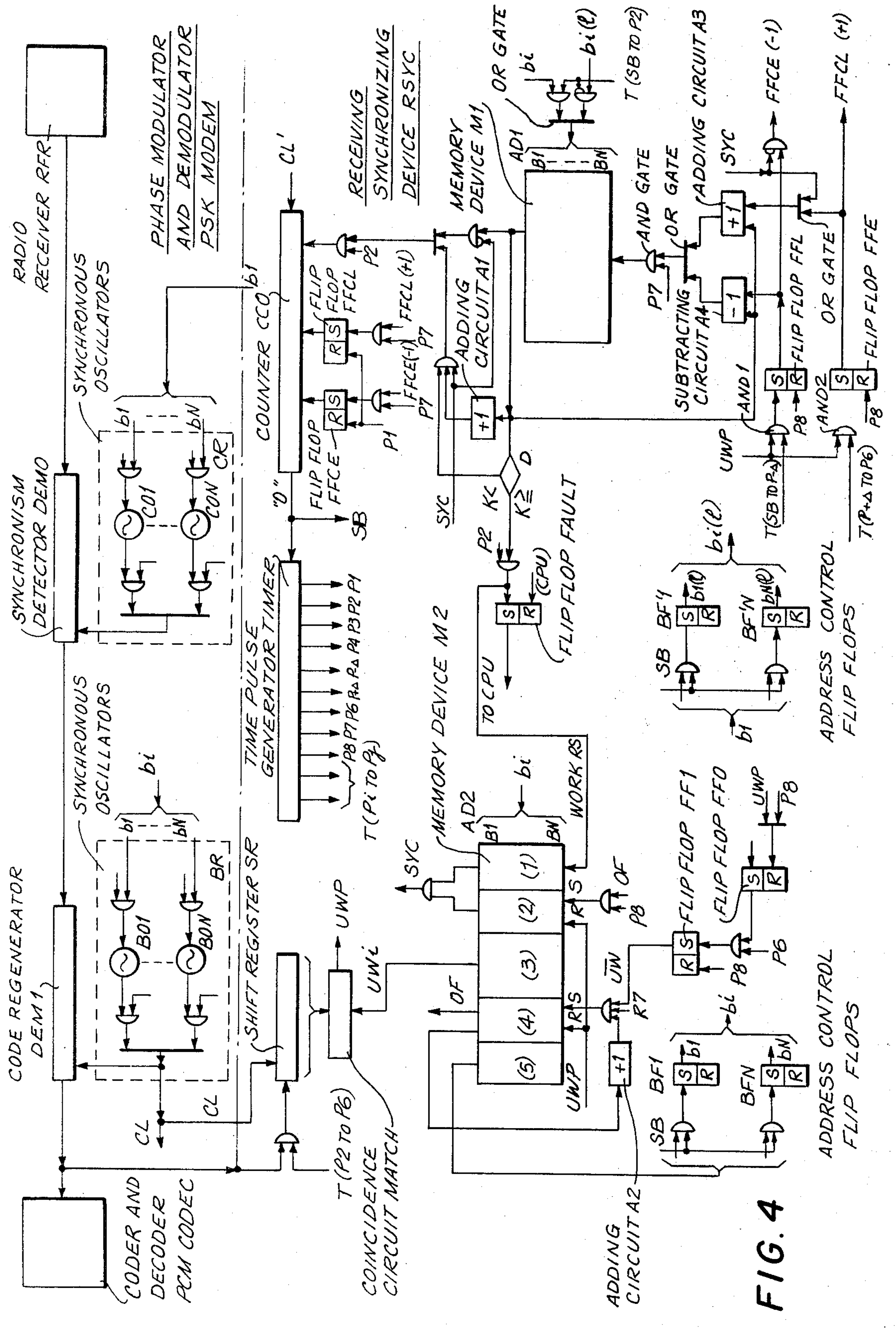
FIG. 4 is a block diagram of an embodiment of the receiving synchronizing device of the ground station of FIG. 3.
Figure 5:
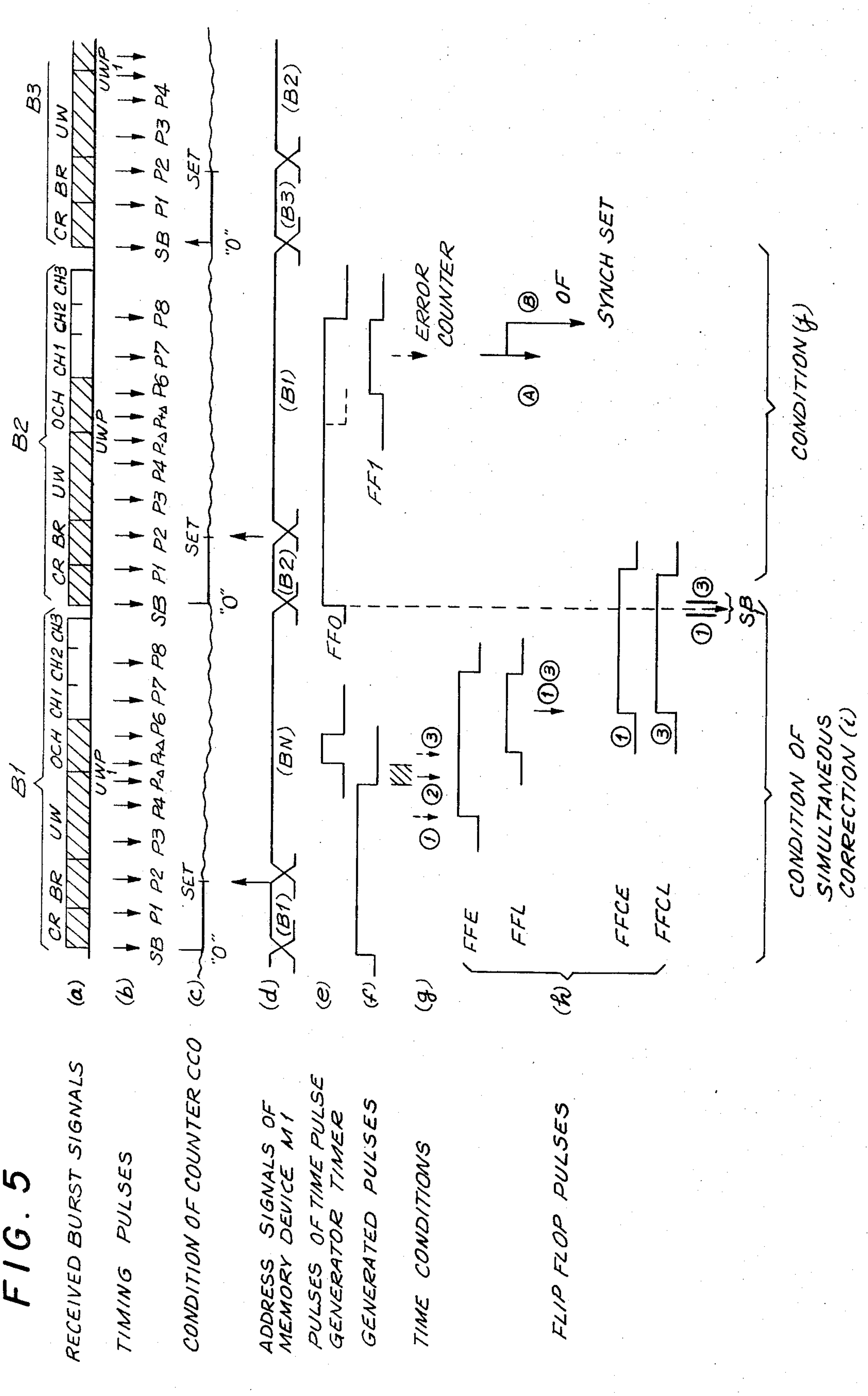
FIG. 5 is a plurality of graphical presentations for assisting in explaining the operation of the receiving synchronizing device of FIG. 4.

As shown in FIG. 3, the control unit CSS of the present invention comprises a receiving synchronizing device RSYC, a receiving channel control device RCHC, a transmitting synchronizing device TSYC and a transmitting channel control device TCHC. FIG. 4 is an embodiment of the receiving synchronizing device RSYC and the part of the phase demodulator PSK DEM related thereto. FIG. 5 shows time diagrams illustrating the operation of the receiving synchronizing device RSYC.

In FIG. 4, when phase modulated signals are received from a radio receiver RFR, carrier waves of the bursts are generated by synchronous oscillators CO1 and CON provided for the carrier waves, in accordance with the bursts. The synchronism detector DEMO is part of synchronous oscillators BO1 to BON for regenerating the PCM signal fundamental frequencies for the bursts. The outputs of the synchronous oscillators BO1 and BON are transferred through a code regenerator DEM1 to the decoder DEC of the coder and decoder PCM CODEC of FIG. 3 as the required PCM pulse train.

As shown in FIG. 4, the receiving synchronizing device PSYC comprises a memory device M1 for recording the value counting the time relation, that is, the intervals between bursts, by the clock pulse CL′ of the ground station of said receiving synchronizing device. A memory device M2 records the order of utilization, that is, the patterns of the bursts, UW signal patterns and the order of arrival of the bursts. Flip flops BF1 to BFN and BF′1 to BF′N control the addresses of the memory devices M1 and M2.

A shift register SR of the receiving synchronizing device RSYC detects the UWP signals. A coincidence circuit MATCH is included in the receiving synchronizing device RSYC. A counter CCO counts intervals between bursts. Various types of timing pulse generators TIMER control the operation of the receiving synchronizing device. The receiving synchronizing device also comprises various types of flip flops, gate circuits, +1 adding circuits and a discriminating circuit for controlling the aforedescribed components.

The five columns of the memory device M2 record the following values for each burst. First, the WORK indication of whether the burst is in operation or not, is recorded. Second, the SYC indication of whether there is synchronism for the burst or not, is recorded. Third, the UW signal pattern of the station discriminating code pattern peculiar to the pattern, is recorded. Fourth, the ERROR COUNTER indication of how many times the UWP signal of the burst was not detected, is recorded. Fifth, the NEXT BURST indication of the number of the next burst is recorded. The memory device M1 records the value indicating the interval from the time P2 (shown in FIG. 5) of each burst to the forecast instant of the SB signal of the next burst by the clock pulse CL′ of the ground station of said memory device.

The operation of the circuit of FIG. 4 is explained in further detail with reference to FIG. 5. If is is assumed that the value of the counter CCO becomes "O," that is, the time for generating the SB signal is reached, the timing pulse generator TIMER first starts to generate a series of timing pulses P1, P2, P3, P4, P–Δ, P+Δ, P6, P7, P8, T (P*i* to P*j*). At the same time, in accordance with the designation of column 5 of the memory device M2, a flip flop such as, for example, the flip flop BF1 showing the number of the burst at the time is set.

The number B1 of the burst B1 consequently dominates the entire device with a burst designating signal b1 from the flip flop BF1. First, gates in the corresponding carrier wave synchronous oscillator CO1 of the phase modulator and demodulator PSK MODEN and gates in PCM fundamental frequency regenerating synchronous oscillator BO1 are switched to their conductive condition by the burst designating signal *b*1. The burst designating signal *b*1 is the output signal of the flip flop BF1 and permits the obtaining of the PCM pulse train and clock pulse CL corresponding to said burst.

Then, the address B1, corresponding to the burst B1 of the memory device M2, is designated, and the informations corresponding to said burst are read out. From these informations, the UW signal pattern recorded in column 3 is supplied to the UW signal detecting coincidence circuit MATCH and is collated with the PCM signal train transferred from the phase modulator and demodulator PSK MODEM and is stored in the shift register SR to detect the UWP signal. The instant of detecting the UWP signal is the correct framing position of the burst and provides the reference time for the operation of the succeeding PCM decoder and other components. The instant of detecting the UWP signal is also the basis for the correction of the memory device M2 for providing the value of the interval between bursts.

With regard to the memory device M1, first, the address B1, corresponding to the burst B1, is read out between the instant of the SB signal and the time *P*2, that is during T (SB to *P*2), and the forecast value of the next burst is set in the counter CCO at the time *P*2. After the time *P*2, the address of the memory device M1 designates the address of the burst immediately preceding said burst (for example, BN) by a signal *b*1 (γ) from the address control flip flops BF'1 to BF'N, so that the operation of the correcting burst B1 may be permitted. This is because in order to detect the UWP signal of the burst B1 and correct the forecast value relating to the time of the SB signal for the burst B1 and rewrite the memory device M1, it is necessary to correct the value of the line of the address BN.

The operation of correction of the memory device M1 is described in detail with reference to FIG. 5. In FIG. 5, curve *a* shows the received burst signals. Curve *b* of FIG. 5 shows various types of timing pulses generated from the timing pulse generator TIMER of FIG. 4. Curve *c* of FIG. 5 shows the condition of the counter CCO. Curve *d* of FIG. 5 shows address signals of the memory device M1. Curve *i* of FIG. 5 shows the condition of simultaneous correction under the condition that there is normal operation during the period of burst B1. Curve *j* of FIG. 5 shows the condition in which the detection of the UWP signal is made impossible during the burst B2.

In FIG. 5, curve *e* shows a pulse T ($P + \Delta$ to $P_6$) generated by the time pulse generator TIMER OF FIG. 4 between $P + \Delta$ and $P_6$. Curve *f* of FIG. 5 shows a pulse T (SB to $P - \Delta$) generated between the instant of the SB signal and P –. The Δ.The pulses T ($P + \Delta$ to $P_6$) and T (SB to $P - \Delta$) are supplied to flip flops FFL and FFE, respectively, of FIG. 4 via UWP detecting time pulses UWP and corresponding AND gates AND 1 and AND 2. As seen in curves *g* and *h* of FIG. 5, therefore, when the UWP signal may be obtained at the time of the pulse T (SB to $P - \Delta$), that is, in a first case 1 of the curve *g* of FIG. 5, the flip flop FFE is set and the UWP signal has arrived before the designated time. It is known that the forecast value relating to the SB signal for the burst is more than necessary and, in this case, one bit is subtracted from the value of the line of address BN of the memory device M1 by a subtracting circuit A4 of FIG. 4 and this is written in the position P7 of the memory device M1.

When the UWP signal may be obtained at the time of pulse T ($P + \Delta$ to $P_6$), that is, in a third case 3, the flip flop FFL is set and the UWP signal has arrived after the designated time. It is known that the forecast value of the SB signal for the burst is less than necessary, and in this case one bit is added to the value of the line of address BN of the memory device M1 by an adding circuit A3 of FIG. 4 and this is written in the position P7 of the memory device M1. Simultaneous correction is completed during normal operation. The forecast value of the correct SB signal is provided in the next burst.

In a second case 2, shown in curve *g* of FIG. 5, the UWP signal is obtained between $P - \Delta$ and $P + \Delta$ and no correction is required in the value of the memory device M1 providing the forecast value of the SB signal. A pair of flip flops FFCE and FFCL of FIG. 4 are supplementary means for correcting the presently proceeding forecast relating to the SB signal of the next burst such as, for example, B2, earlier on the basis of the correction of the forecast value relating to the present burst B1.

When the UWP signal cannot be detected at the designated time, that is, in the present example, before P6 at the latest, it is determined that the UWP signal cannot be detected, to avoid confusion of the system. Information concerning the burst of the frame is cancelled and it is attempted to detect the UWP at the present forecast position of the SB signal over several frames. When the UWP signal cannot be detected over the designated several frames, it is determined that framing is impossible, and the synchronizing operation is started.

In the case of the curve *j* of FIG. 5, the UWP signal of the burst B2 was not detected. When the SB signal of the burst B2 is provided by the counter CCO, flip flop FFO of FIG. 4 is set. The flip flop FFO is also set by the SB signal of the burst B1. If the UWP signal is detected before the time P6, the flip flop FFO is reset, but if the UWP signal is not detected, a flip flop FF1 is set at the time P6 and a signal UW, indicating that the UWP is not yet detected, is generated, and one bit is added to the error counting value of column 4 of the memory device M2 by an adding circuit A1 and this is written again in column 4 at P7.

If the error counting value is less than the designated value, synchronism correcting operation of the burst is required in the next frame, but if the error counting value is greater than the designated value, that is, if the UWP signal cannot be detected over several continuous frames, synchronizing operation for said burst is performed. This is indicated in column 2 of the memory device M2. That is, if column 4 of the burst exceeds the designated value and a signal OF is provided, column 2 of said burst of the memory device M2 is set to "1" at the time of P8.

When the synchronizing operation is started, signal SYC is read out of column 2 of the memory device M2 each time the address of memory device M2 of the frame becomes the burst after the next frame. Consequently, the forecast position of the SB signal for the burst of the memory device M1 is automatically shifted backward by one bit by the adding circuit A1. This operation is continued until the UWP signal of the burst is detected.

When the UWP signal of the burst cannot be detected, however, even if the SB signal is shifted to near the burst immediately following said burst, it is deemed that there is a fault in said burst and column 1 of the memory device M2 is reset. Furthermore, a flip flop FAULT is set and an indication is transferred to central processor CPU (FIG. 3). The initial setting and modification of the memory devices M1 and M2 shown in FIG. 4 are all performed by the central processor CPU. The system for detecting the UWP signal, the initial synchronizing operation and the accessory components for the operation of the system of FIG. 4 are related to the system of the invention, but do not limit the essence of the invention.

Figure 6:
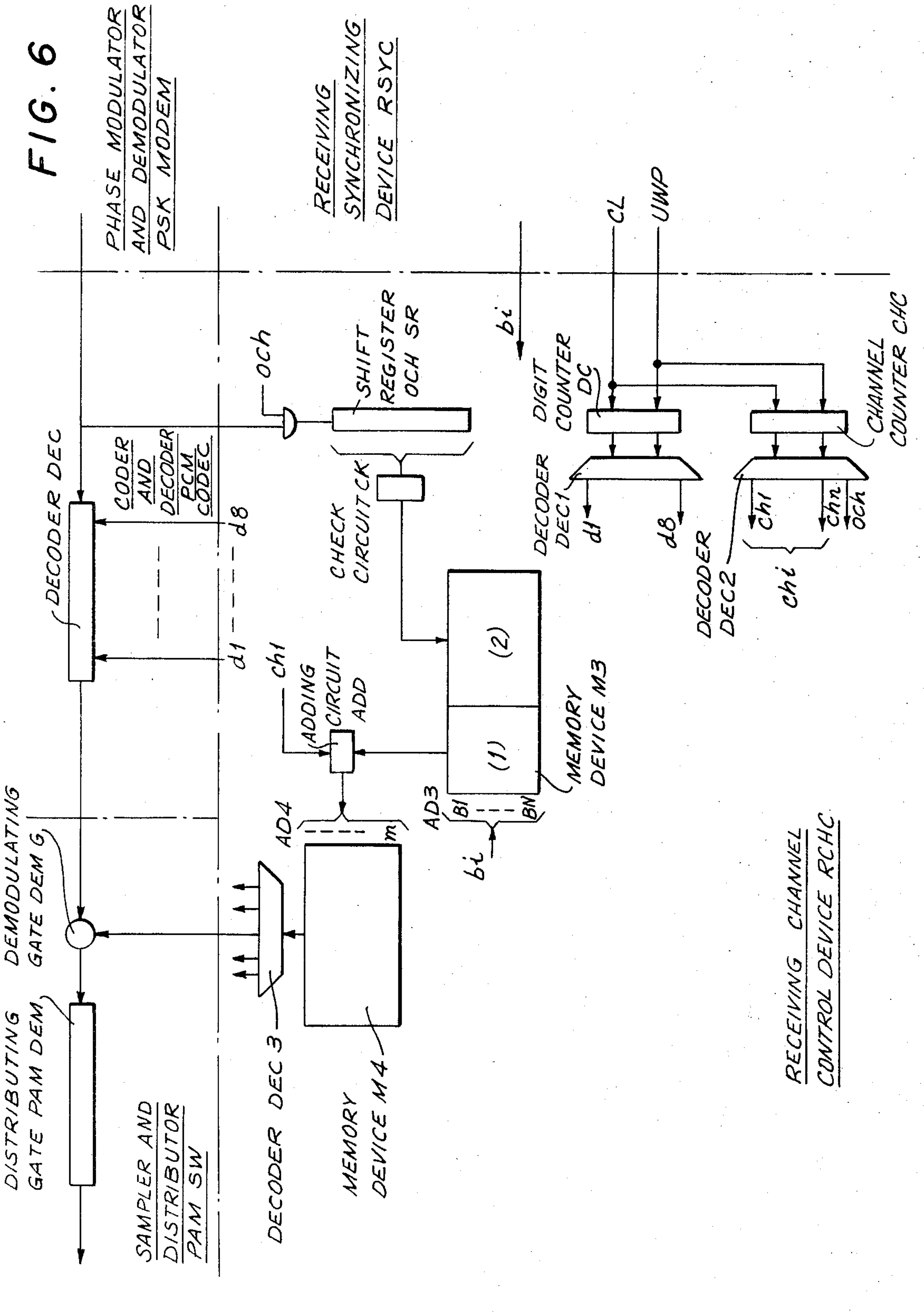
FIG. 6 is a block diagram of an embodiment of the receiving channel control device of the ground station of FIG. 3.

FIG. 6 shows an embodiment of the receiving channel control device RCHC of the control unit CSS of FIG. 6. The receiving channel control device RCHC is operated by clock pulse CL, UWP signal and burst designating signal bi generated in synchronizm with the burst being received by the receiving synchronizing device RSYC of FIG. 4. When the UWP signal is provided by the receiving synchronizing device RSYC, a digit counter DC and a channel counter CHC are reset. The counters DC and CHC then start counting via the clock pulse CL of the received burst and generate time or timing pulses ch1 to chn and Och, showing the channel positions and digit pulses such as, for example, d1 to d8, showing the bit positions within the channels through decoders DEC1 and DEC2 and distribute said pulses to parts of the receiving channel control device.

Informations in a received burst, as seen from FIG. 2, start with data channel OCH including the control information. The information of the channel OCH is extracted from the PCM pulse train from phase modulator and demodulator PSK MODEM by pulse Och. The information is then supplied to a shift register OCH SR of FIG. 6 and a check circuit CK determines whether it is the required information or not. If it is the required information, it is once stored in column 2 of the line of the address of the received burst of a memory device M3 and this is supplied to the central processor CPU, which performs the proper processing.

PAM pulse demodulation is provided in channels CH1 to CHn including general talking informations succeeding the data channel by the PCM demodulator or decoder DEC under the control of digit pulses $d1$ to $d8_1$, and said pulses are applied to a PAM demodulating gate DEM G for the designated channel device. As described with reference to FIG. 3, the PAM demodulating gate DEM G of each channel device must be switched to its conductive condition at the designated channel position of the designated burst.

In the case of the VDMA system, the PAM demodulating gate DEM G to be switched to its conductive condition at channel positions of the bursts is different depending on the calls. Furthermore, it is also possible that the number of channels held by each burst is changed during the operation. Taking this condition into consideration, the memory device M3, a memory device M4 and an adding circuit ADD are provided for switching the demodulating gate DEM G to its conductive condition and to its non-conductive condition at the proper time. The memory device M3 has an address B1 to BN corresponding to the N bursts. The memory device of each of the talking channels of bursts, before each burst, utilizes the burst of the ground station to which the memory device belongs as the reference, said burst being written in column 1. It should be noted here that the burst of the station is B1 and "0" is written in the address of B1.

It is not absolutely necessary to demodulate and receive the channel information of the burst of the station, but said information may also be received. The memory device M4 has addresses of a number equal to the maximum number, for example, *m*, of the channels which the satellite system has, and these addresses memorize the number of the corresponding talking channels. These numbers may, of course, be changed by calls and the control is performed by the central processor CPU. The address designating information of the memory device M4 may be obtained by adding the content of column 1 of the memory device M3 to the channel number chi at the time.

Figure 7:
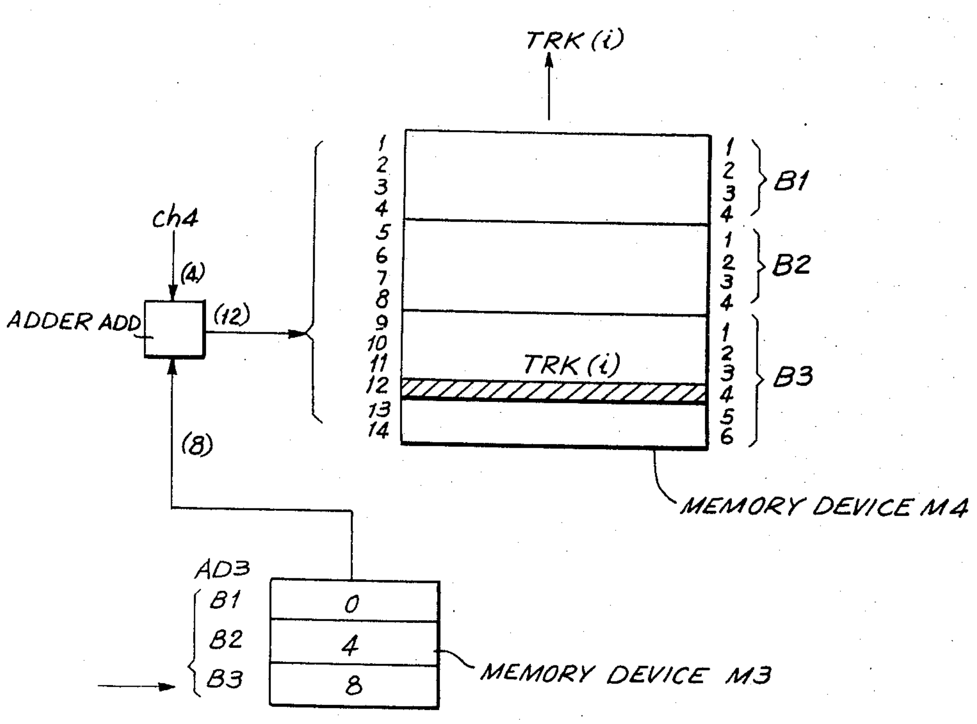
FIG. 7 is a schematic diagram illustrating the operation of the receiving channel control device of FIG. 3.

FIG. 7 explains the operation of the receiving channel control device RCHC by illustrating concrete numerical values. In FIG. 7, the number of the all channels of the satellite system is 14 and the number of bursts is 3 (B1, B2, B3). The burst B1 holds 4 channels, the burst B2 holds 4 channels and the burst B3 holds 6 channels. It is assumed that the talking channel TRK (i) of the burst B1 of a specific station receives the signal of the fourth channel of the burst B3. The talking channel TRK (i) is recorded in address 12 of the memory device M4. While the burst B3 is being received and when the channel is 4 (ch4), address 12 of the memory device M4 is designated and the number TRK (i) is read out from said memory device. The PAM demodulating gate DEM G of the designated talking channel is switched to its conductive condition via a decoder DEC 3 (FIG. 6), and the desired object may be achieved. Needless to say, as hereinbefore described, the central processor CPU controls the contents of the memory devices M3 and M4.

Figure 8:
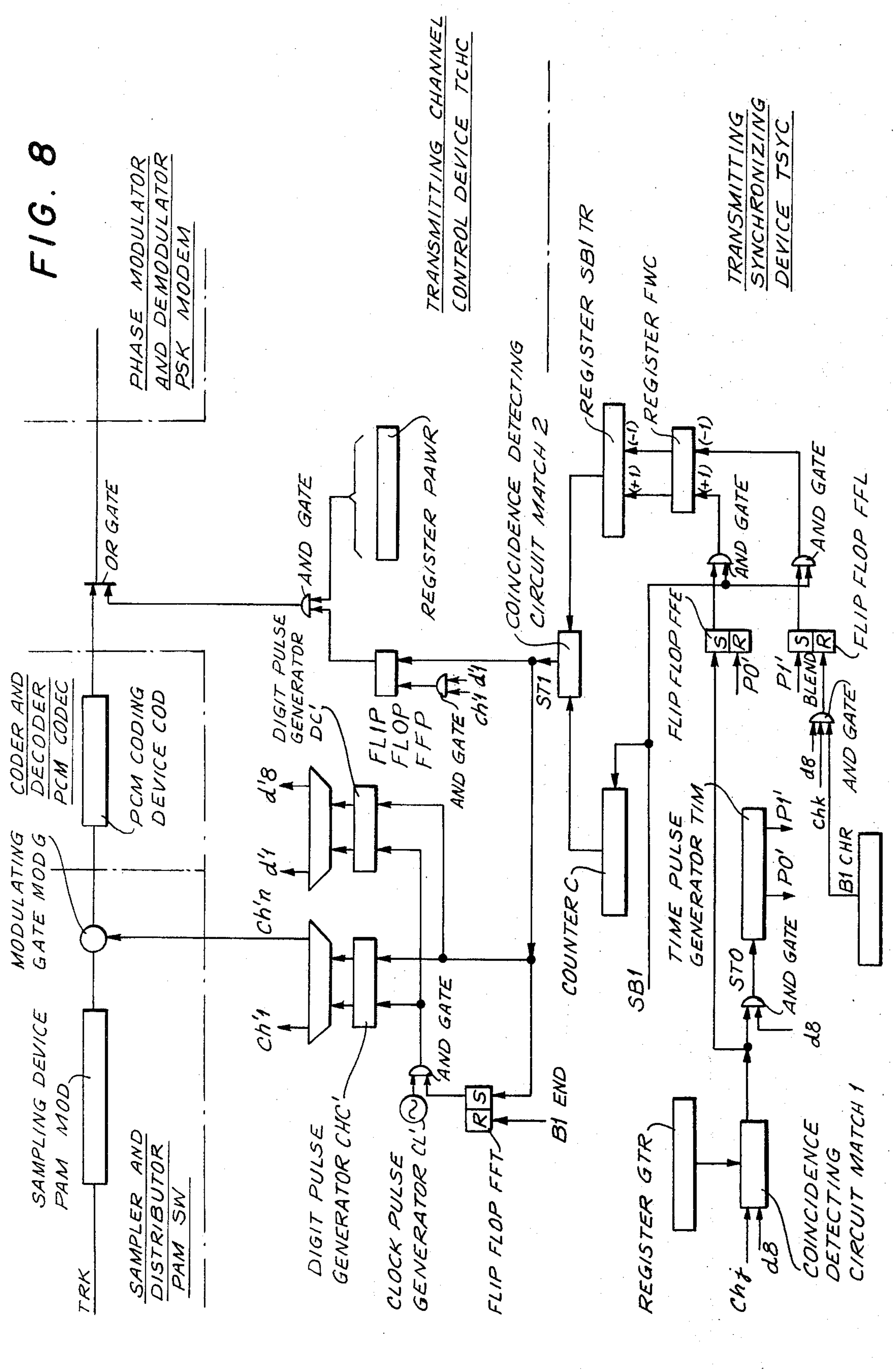
FIG. 8 is a block diagram of an embodiment of the transmitting synchronizing device and an embodiment of the transmitting channel control device of the ground station of FIG. 3.

The transmitting channel control device TCHC and the transmitting synchronizing device TSYC of FIG. 3 are explained by FIG. 8, which illustrates an embodiment of each. The transmitting channel control device TCHC comprises a clock pulse generator CL′ for generating the clock pulse of the ground station of the transmitting channel control device TCHC, the station's channel and digit pulse generators CHC′ and DC′, and a register PAWR for recording synchronizing signals CR and BR, UW signal and information transmitted via data channel DCH of said station (shown in FIG. 2). The time of radiating a burst from the station to the satellite is controlled by the transmitting synchronizing device TSYC.

When the time is reached, the flip flop FFP is set by the station's burst transmitted starting signal ST1 and the designated information is transmitted from the register PAWR to the satellite via the phase modulator PSK MOD. PAM modulation is then effected and PCM modulation and phase modulation are then effected on the aural signals of the designated talking channel via the timing pulse generated by the station's channel pulse and the digit pulse generators CHC′ and DC′. The signals are transmitted to the satellite. The station's burst radiated to the satellite is regulated by the flip flop FFT. The transmitting synchronizing device TSYC controls the flip flop FFT.

The chief function of the transmitting synchronizing device TSYC is to control the time of radiating the station's burst and to always maintain the burst properly so that bursts from a plurality of stations may not be mutually overlapped on the satellite. In order to achieve this object, the cooperation of the transmitting synchronizing device TSYC and the receiving synchronizing device RSYC is absolutely necessary. Time pulses of FIG. 8 which are not primed, are provided by the receiving synchronizing device RSYC and the receiving channel control device RCHC.

In the embodiment of FIG. 8, a relative difference in the frame between the time of the SB signal, abbreviated as SB1, upon the receipt of the station's burst B1 and the time of transmitting the station's burst is supplied by the central processor CPU to a register SB1 TR in the initial starting period of the system, and the station's burst is transmitted in accordance with the content of said register. Furthermore, the interval between the SB1 signal of the station's burst and the position of the last bit in the burst immediately preceding said burst is always supervised and the contents of the register SB1 TR are corrected so that the interval may be maintained at the proper value.

Figure 9:
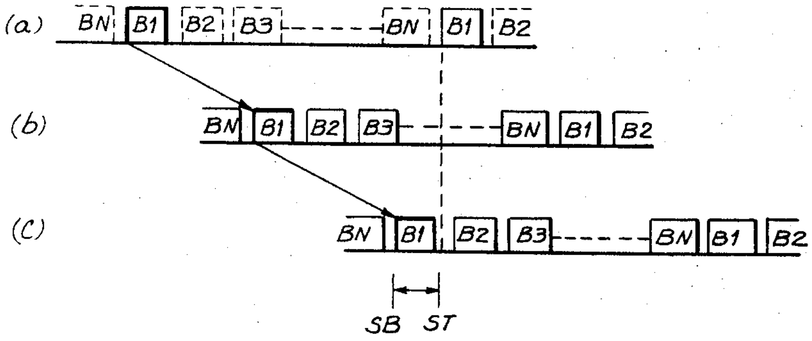
FIG. 9 is a plurality of graphical presentations for assisting in explaining relative time differences in the ground station of FIG. 3.

The relative difference in the frame between the time SB of the SB signal SB1 at the receiver and the time ST of the station's burst transmission time signal is explained with reference to FIG. 9. In FIG. 9, curve *a* shows the time position of a burst B1 from a specific ground station. Curve *b* of FIG. 9 shows the time position of the burst on the satellite. Curve *c* of FIG. 9 shows the time position of the burst received by the ground station. As is evident from FIG. 9, there arises a delay equal to the time of propagation determined by the distance between the ground station and the satellite, while the burst B1 transmitted from the ground station is relayed by the satellite and is transferred back to the ground station. Consequently, a relative difference arises between the time SB of the SB1 signal and the time ST of the station's burst transmission signal. The relative difference is determined by the distance between a ground station and the satellite. Each ground station has its peculiar relative difference.

The aforedescribed operation is explained in further detail with reference to the circuit diagram of FIG. 8 and the diagram of FIG. 10, which shows time relations. The position of the last bit of the burst immediately preceding the burst of a specific station is detected by a coincidence detecting circuit MATCH 1 of FIG. 8 by referring to the contents of a register GTR and by the use of the timing pulse from the receiving control part. A starting signal STO is generated. The starting signal STO starts a time pulse generator TIM to generate timing pulses P0′ and P1′.

If the SB1 signal of the station's burst is supplied by the receiving synchronizing device RSYC between the time of the generation of the starting signal STO and the time of generation of the pulse P0′, it is judged that the interval between the station's burst and the immediately preceding burst has been shortened, and one bit is added to the contents of the register SB1 TR. If the SB1 signal is supplied after the time of generation of the pulse P1′, it is judged that the interval has been expanded and one bit is subtracted from the contents of the register SB1 TR. A register FWC (FIG. 8) is provided, since the aforedescribed operation sometimes requires an integration effect of a certain extent to insure safety of the system.

Figure 10:
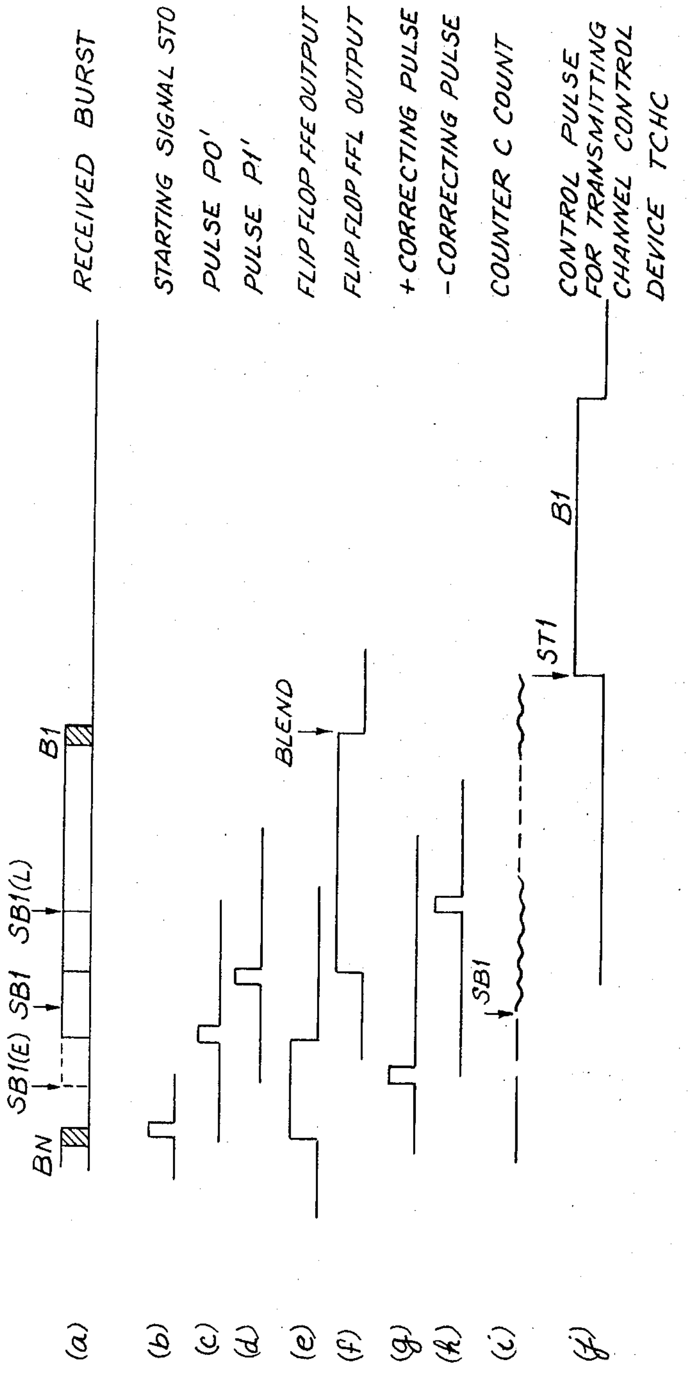
FIG. 10 is a plurality of graphical presentations for assisting in explaining the transmitting synchronizing device and the transmitting channel control device of FIG. 8.

FIG. 10 is a time relation diagram illustrating the aforedescribed operation. In FIG. 10, curve *a* shows a received burst, curve *b* shows a starting signal STO, curve *c* shows the pulse P0′ and curve *d* shows the pulse P1′. The pulses P0′ and P1′ are provided by the timing pulse generator TIM of FIG. 8. The curve *e* of FIG. 10 shows the output of the flip flop FFE of FIG. 8 and said flip flop is set by the starting signal STO and is reset by the pulse P0′. The curve *f* of FIG. 10 shows the output of the flip flop FFL of FIG. 8. The flip flop FFL is set by the pulse P1′ and is reset by the last bit position, at the B1 end of the station's burst at the receiver.

If SB1 signal of the receiver arrives in the time slot shown in curve *e* of FIG. 10, *a* + correcting pulse, shown in curve *g* of FIG. 10, is generated. If the SB1 signal arrive in the time slot shown in curve *f* of FIG. 10, *a* − correcting pulse, shown in curve *h* of FIG. 10, is generated and, as hereinbefore described, the contents of the register SB1 TR of FIG. 8 are corrected. If the SB1 signal arrives between the pulses P0′ and P1′, it is judged that the time relation is proper, and no correction is made in the contents of the register SB1 TR.

The counter C of FIG. 8 is started when the SB1 signal is provided. The counter C counts the station's clock pulse CL′ and the station's burst transmission starting signal ST1, showing the time of transmission of the station's burst, is generated at the instant of coincidence of the contents of said counter and the contents of the register SB1 TR. Therefore, as hereinbefore described, the transmitting channel control device TCHC is started, as shown in curve *j* of FIG. 10.

Various types of registers of FIG. 8 are controlled by the central processor CPU. Operations in the initial starting period of the system and selection of the information initially provided by the central processor CPU to the register SB1 TR are important, but do not specifically limit the invention.

While the invention has been described by means of specific examples and in a specific embodiment, I do not wish to be limited thereto, for obvious modifications will occur to those skilled in the art without departing from the spirit and scope of the invention.

I claim:

1. A time division multiplex communication system in which the same transmission medium is utilized by a plurality of stations in a predetermined sequence in a burst in a time division system, each burst including a station discriminating signal for discriminating the stations, said communication system comprising a detector for detecting the station discriminating signal; clock means for providing local clock signals; a counter connected to the clock means for counting local clock signals and counting intervals between bursts to indicate the time for producing forecast instant burst start time signals; memory means connected to the detector and the counter, said memory means comprising first memory means for storing the intervals between bursts and a value indicating the interval from a specified time of each burst to the forecast instant burst start time signal of the next-succeeding burst and for reading out an address corresponding to the burst after a burst start time signal and before a specific time instant and setting the forecast value of said next-succeeding burst in said counter, said first memory means designating the address of the next-preceding burst after the lapse of a specific period of time, and second memory means for storing whether of not a burst is in operation, whether or not there is synchronization for a burst, the station discriminating signals, the patterns of the bursts, the order of arrival of the bursts and an indication of the number of the next-succeeding burst; coincidence means coupled between the memory means and the detector for comparing the station discriminating signals read out from the memory means and the station discriminating signal of a received burst and providing a coincidence signal when there is coincidence between such signals; a shift register connected between the coincidence means and the memory means for storing a collated coincidence signal from the coincidence means and a detected PCM signal train to detect the instant of proper receipt of the station discriminating signal, the second memory means storing an indication of how many times the instant of proper receipt of the station discriminating signal of the burst was not detected; correcting means connected to the first memory means of the memory means for correcting the values stored in the first memory means; and correcting means connected to the second memory means of the memory means for correcting the values stored in the first memory means.

2. A time division multiplex communication system as claimed in claim 1, further comprising digit counting means and channel counting means connected to the detector and the coincidence circuit for counting via the clock pulse of the received burst and producing time pulses indicating channel positions and digit pulses showing the bit positions within the channels, decoders connected to the digit and channel counting means for distributing the time pulses, a shift register, means for deriving control information from the PCM pulse train and supplying the control information to the shift register, checking means connected to the shift register for determining whether or not the control information is required, third memory means connected to the checking means for storing the control information, said checking means passing the control information from the shift register to the third memory means when said control information is required, PAM demodulating gate means switched to its conductive condition at a designated channel position of a designated burst, adding means connected to the third memory means, and fourth memory means connected between the adding means and the PAM modulating gate means for selectively switching the PAM demodulating gate means to its conductive condition and its non-conductive condition.

3. A time division multiplex communication system as claimed in claim 1, wherein one of the stations of the system is a satellite station, and further comprising clock pulse generating means for generating the clock pulse of the station, digit pulse generating means connected to the clock pulse generating means, channel pulse generating means connected to the clock pulse generating means, register means for storing synchronizing signals, a station discriminating signal and information transmitted via a data channel of the station, phase modulating means connected to the register means, said register means transmitting designated information to the satellite station via the phase modulating means, flip flop means connected to the channel pulse and digit pulse generating means for regulating the station burst radiated to the satellite station, and transmitting synchronizing means connected to and controlling the flip flop means.

* * * * *